US009560022B1

(12) United States Patent
Kiyohara

(10) Patent No.: US 9,560,022 B1
(45) Date of Patent: *Jan. 31, 2017

(54) AVOIDING COLLECTION OF BIOMETRIC DATA WITHOUT CONSENT

(71) Applicant: Google Inc., Mountain View, CA (US)

(72) Inventor: Keith Shoji Kiyohara, Santa Monica, CA (US)

(73) Assignee: GOOGLE INC., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/224,403

(22) Filed: Jul. 29, 2016

Related U.S. Application Data

(63) Continuation of application No. 12/827,883, filed on Jun. 30, 2010, now abandoned.

(51) Int. Cl.
| H04K 1/00 | (2006.01) |
| H04L 29/06 | (2006.01) |
| H04W 12/04 | (2009.01) |
| H04W 12/06 | (2009.01) |
| H04L 1/00 | (2006.01) |
| H04L 9/32 | (2006.01) |

(52) U.S. Cl.
CPC .......... *H04L 63/0428* (2013.01); *H04L 63/06* (2013.01); *H04L 63/083* (2013.01); *H04W 12/04* (2013.01); *H04W 12/06* (2013.01)

(58) Field of Classification Search
CPC ...... H04W 12/02; H04W 12/06; H04W 12/04; H04L 63/0428
USPC .............................. 380/270; 713/171; 726/36
See application file for complete search history.

(56) References Cited

U.S. PATENT DOCUMENTS

| 2003/0131247 A1 | 7/2003 | Cannon |
| 2003/0149343 A1 | 8/2003 | Siegel et al. |
| 2003/0156740 A1 | 8/2003 | Siegel et al. |
| 2003/0229811 A1 | 12/2003 | Siegel et al. |
| 2004/0010696 A1 | 1/2004 | Cannon et al. |
| 2007/0201694 A1* | 8/2007 | Bolle .................... G06T 1/0021 380/205 |
| 2008/0091723 A1* | 4/2008 | Zuckerberg ............ G06Q 30/02 |

(Continued)

FOREIGN PATENT DOCUMENTS

WO         2005008399 A2       1/2005

*Primary Examiner* — Evans Desrosiers
(74) *Attorney, Agent, or Firm* — Procopio, Cory, Hargreaves & Savitch LLP

(57) ABSTRACT

Electronic content, such as an image, video, or audio file, may be tagged as being associated with an individual. When the electronic content contains biometric data related to the individual, the individual's authorization may be required or preferred before the requested association is made or shared. In a method, a request is received from a tagger to associate a taggee with electronic content. Before the association is made (and potentially shared), the tag data is encrypted. The cryptographic key is sent to the taggee. The encrypted tag data is stored and indexed based on an address associated with the taggee, such as the taggee's email address. When the taggee receives and activates the cryptographic key, the tag data is decrypted and an association is made between the taggee and the electronic content. Biometric data of the taggee included in the electronic content may then be collected and shared.

18 Claims, 7 Drawing Sheets

(56) References Cited

U.S. PATENT DOCUMENTS

2008/0104709 A1* 5/2008 Averyt ............... G06F 21/6218
                                                   726/27
2008/0175390 A1   7/2008 Alessio et al.
2009/0150671 A1   6/2009 Abe

* cited by examiner

| primary key | data |
|---|---|
| 0x384a.... [hashed value of "alice@abc.com"] | 0x7c73.. [ciphertext of "bob@xyz.com"] |

AVOIDING COLLECTION OF BIOMETRIC DATA WITHOUT CONSENT

CROSS-REFERENCE TO RELATED APPLICATIONS

This application is a continuation application that claims priority with respect to U.S. application Ser. No. 12/827,883, filed on Jun. 30, 2010, the content of which is incorporated herein by reference in its entirety.

BACKGROUND

Field

Embodiments of the present invention relate to biometric identification, particularly associating an individual with electronic content.

Background

It has become commonplace for various types of electronic content, such as images, videos, or audio, to be posted on the Internet and accessible to users. Many programs currently exist for posting electronic content on the Internet. In these programs, users who upload content to the online system have the option of associating the content with one or more individuals. Such an association is referred to as "tagging."

The ease with which such content can be uploaded onto a public website and shared with others, along with an identification of the individual(s) associated with the content, may raise privacy concerns. It may be undesirable to some individuals for their information to be publicly available. Indeed, in some jurisdictions, it may be illegal to post information about an individual without that individual's authorization in certain contexts. Accordingly, the ability to extract biometric information of an individual from electronic content without that individual's consent violates may raise privacy concerns.

Accordingly, what is needed is a way for an individual to easily provide consent to be tagged in a given image.

SUMMARY

Embodiments of the present invention relate to encrypting tag data and requiring a taggee's consent before data can be decrypted and used. An embodiment includes receiving a request from a tagger to tag a taggee in electronic content, such as an image file, a video file, or an audio file. Before the tag data is made available to the public, the tag data is encrypted. The encryption key is sent to the taggee, and the tag data is stored under a location associated with the taggee. In an embodiment, the location is associated with a hashed version of the taggee's address. In an embodiment, the encryption key is sent to the taggee via email, and the location at which the encrypted tag data is stored is associated with a hashed version of the taggee's email address. When the taggee receives the encryption key, the taggee can use the encryption key to decrypt the tag data associated with the taggee. In an embodiment, the decryption by the taggee is considered an indication of consent by the taggee to make the tag data public. In another embodiment, the taggee may view the tag data and associated electronic content before providing consent to make the tag data public. In a further embodiment, biometric information can be received from the tagged electronic content to develop or add to a biometric model of the taggee.

A system embodiment includes at least one server configured to store and provide access to electronic content; a security module configured to prevent unauthorized association of electronic content with a taggee, and a tag data storage medium configured to store the tag data based on a primary key. In an embodiment, the security module includes an encryption module and a decryption module. The encryption module may be configured to encrypt received tag data associated with the taggee using a cryptographic key, send the cryptographic key to the taggee, and generate a primary key based on a taggee address, wherein the tag data is data providing information about the electronic content. The decryption module may be configured to receive the cryptographic key from the taggee and decrypt the tag data using the cryptographic key.

Further embodiments, features, and advantages of the invention, as well as the structure and operation of the various embodiments of the invention are described in detail below with reference to accompanying drawings.

BRIEF DESCRIPTION OF THE DRAWINGS

Embodiments of the invention are described with reference to the accompanying drawings. In the drawings, like reference numbers may indicate identical or functionally similar elements. The drawing in which an element first appears is generally indicated by the left-most digit in the corresponding reference number.

DETAILED DESCRIPTION

Biometric models are useful in quickly scanning electronic content to identify individuals associated therewith. Social media-based biometric models expand the utility, allowing others to provide electronic content useful in updating an individual's biometric model. However, such activities may constitute an invasion of an individual's privacy if the individual associated with the content is not provided the option of authorizing the association or its subsequent use. Indeed, in some jurisdictions, taggee consent is a legal requirement before a taggee can be associated with electronic content.

Allowing unauthorized public users of a given application to view certain associations is not the only concern. Some content-sharing programs centrally store electronic content indexed by user, so it may be possible for an untrustworthy application to access user-specific content without authorization.

Embodiments of the present invention avoid the possibility of such invasions of a user's privacy. Tag data relating to the association between a taggee and electronic content is encrypted in such a way that only the taggee has the ability to decrypt the information. Further, the taggee's identity may be hidden, so that the taggee cannot even be identified from a list of individuals associated with encrypted tag data. In this way, the taggee is in control over electronic content associated with the taggee. This in turn allows the taggee to control the use of biometric information included in that electronic content to generate a biometric model of the taggee.

While the present invention is described herein with reference to illustrative embodiments for particular applications, it should be understood that the invention is not limited thereto. Those skilled in the art with access to the teachings provided herein will recognize additional modifications, applications, and embodiments within the scope thereof and additional fields in which the invention would be of significant utility.

1. System

Figure 1:
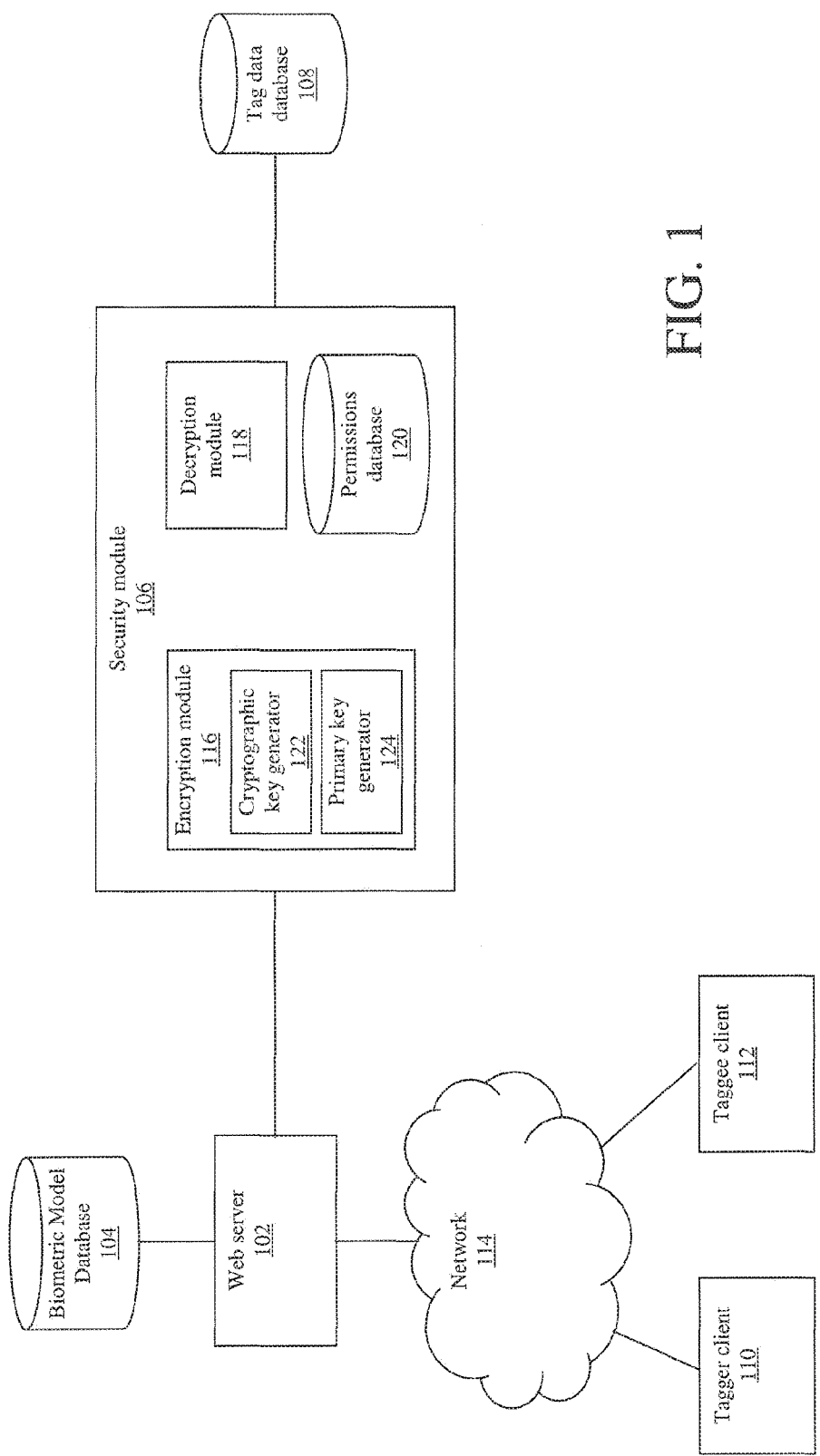
FIG. 1 is a diagram illustrating a system for associating electronic content with an individual, according to an embodiment of the present invention.

FIG. 1 illustrates a system 100 for associating biometric data with an individual once authorization for the association has been received from that individual. While the following is described in terms of particular embodiments, the invention is not limited to these embodiments. For example, any system having generally the structure of FIG. 1, or that would benefit from the operation, methods and functions as described herein may also be used.

According to an embodiment of the present invention, system 100 includes a web server 102, a biometric model database 104, a security module 106, and a tag data database 108. Client devices 110, 112 connect to web server 102 through a network 114. Web server 102 may be implemented on any server device that can support any web operation. Such a server device can include, but is not limited to, a personal computer, mobile device such as a mobile phone, workstation, embedded system, game console, television, set-top box, or any other computing device that can support web browsing. Such a server device may include, but is not limited to, a device having a processor and memory for executing and storing instructions. Such a server device may include software, firmware, and hardware. Software may include one or more applications and an operating system. Hardware can include, but is not limited to, a processor, memory and graphical user interface display. An optional input device, such as a mouse, may be used. Web server 102 may store electronic content provided by one or more clients 110, 112 over network 114.

Network 102 may include one or more networks, including but not limited to, a local area network, medium-area network, and/or wide-area network, such as, the Internet. Network 102, for example, may be a wired or wireless network that allows clients 110, 112 and server 102 to communicate with each other.

Databases 104, 108, and 120 may include one or more storage devices, such as random access memory (RAM), a hard disk drive, or a removable storage drive.

A client, such as tagger client 110 or taggee client 112, may be implemented on any client device that can support web browsing. Such a client device can include, but is not limited to, a personal computer, mobile device such as a mobile phone, workstation, embedded system, game console, television, set-top box, or any other computing device that can support web browsing. Such a client device may include, but is not limited to, a device having a processor and memory for executing and storing instructions. Such a client device may include software, firmware, and hardware. Software may include one or more applications and an operating system. Hardware can include, but is not limited to, a processor, memory and graphical user interface display. An optional input device, such as a mouse, may be used.

Tagger client 110 may contact web server 102 and upload electronic content (e.g., an image file, a video file, or an audio file) to be stored on web server 102. The electronic content may be intended to be shared via a content-sharing program. The content-sharing program may be accessed directly or via a web browser. A tagging user (referred to herein as a "tagger") may use tagger client 110 to provide information regarding an individual (the "taggee") associated with the content uploaded to web server 102. Such information is referred to as a "tag." For example, if the content is an image file, the tag may identify an individual present in the image. The tag may be, for example, the taggee's name, the taggee's username, or the taggee's address. Data associating the taggee with the electronic content is referred to herein as tag data, and may include a link between the tagger and the taggee, such as the tagger's address.

Tag data may also include the location at which the image was taken. Location information for tag data may be, for example and without limitation, entered by text, pinpointed on a map, or embedded in the image file as GPS information. The GPS information can be embedded, for example, when a person takes a mobile picture of the taggee, as many mobile devices have GPS capability. Location information for tag data may also be determined based on landmarks, buildings, etc. in the image, using an object-recognition product. Although these examples are given in the context of image files, one of skill in the art will recognize that similar examples would also apply to other electronic content, such as video files and audio files.

In addition to the tag data described above, biometric data of the taggee may also be extracted from the electronic content. For example, face data may be extracted from the electronic content. In an embodiment, if the electronic content is obtained with a high resolution camera, the pore structure of the taggee's skin can be extracted. In an embodiment, genetic characteristics and anomalies can also be extracted from the electronic content.

Before the tag data is stored on the web server 102, security module 106 determines whether web server 102 is authorized to collect biometric information about the taggee. In an embodiment of the present invention, security module 106 includes an encryption module 116, a decryption module 118, and a permissions database 120. Encryption module 116 may include a cryptographic key generator 122 and a primary key generator 124. Security module 106 may be coupled to tag data database 108.

In an embodiment, when data associating a taggee with electronic content is received by security module 106, security module 106 checks permissions database 120 to determine whether the taggee has already provided consent for web server 102 to store biometric information without further authorization. Biometric information may include, for example and without limitation, information to be used by a face-recognition application in creating a face model. If the taggee has already provided such consent, then web server 102 extracts biometric information from the electronic content, associates the biometric information with the taggee, and stores the biometric information in biometric model database 104.

If the taggee has not already provided authorization for web server 102 to store biometric information, or if the taggee has a biometric model but has not provided authorization to automatically add to that model, the tag data is encrypted. Cryptographic key generator 122 generates a cryptographic key. The cryptographic key may be generated using, for example, any one of a number of commonly-known encryption schemes, such as a 128-bit encryption scheme. In an embodiment, the cryptographic key is a random cryptographic key. The newly-generated cryptographic key is used to encrypt the tag data. Encryption module 116 stores the encrypted tag data in tag data database 108.

Figures 2, 3:
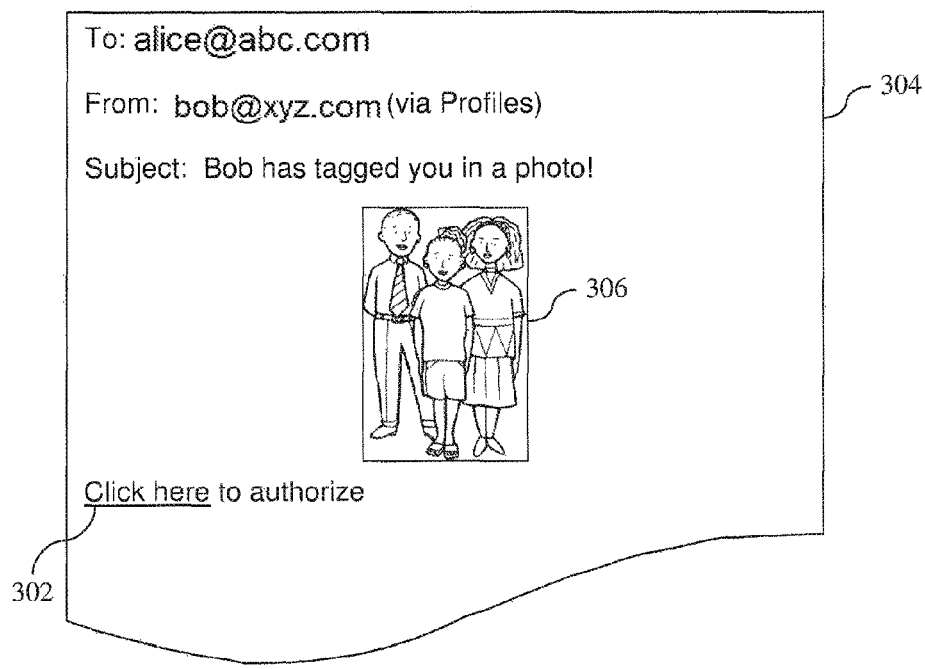
FIG. 2 is an exemplary entry in a tag data database, according to an embodiment of the present invention.
FIG. 3 is an exemplary email with a cryptographic key that may be sent to a taggee, according to an embodiment of the present invention.

FIG. 2 illustrates an exemplary database indexing scheme for storing the encrypted tag data. The exemplary database includes two types of fields, a "primary key" field and a "data" field. In the example of FIG. 2, the encrypted tag data is stored as ciphertext in the "data" field, which was encrypted using the cryptographic key. A primary key by which the encrypted tag data is indexed and stored may be generated by primary key generator 124. In an embodiment, the primary key is the same as an address of the taggee. In another embodiment, the primary key is a hashed version of the taggee's address, such that the taggee cannot be identified from mere inspection of the database. Such an embodiment prevents the holder of the tag data (e.g., the database owner) from associating the tag data with the taggee, since the holder of the tag data cannot reverse engineer the taggee address from the hashed value, and therefore cannot associate stored encrypted tag data with the taggee. Further, when the cryptographic key is not stored by the holder of the tag data, the holder also cannot decrypt the tag data.

The address used by the primary key may be, for example and without limitation, an email address, a username, or an IP address of the taggee. In an embodiment where the primary key is a hashed version of the taggee's address, the primary key may be generated by inputting the taggee's address into a secure hashing algorithm. Such hashing algorithms are well-known to those of skill in the art. The output of such a hashing algorithm is a fixed-size bit string that can then be used as the primary key in the database index (shown as "primary key" in FIG. 2).

Returning to FIG. 1, encryption module 116 sends the newly-generated cryptographic key to the taggee. In an embodiment, the cryptographic key is sent in an email. The cryptographic key may be attached to the email, or it may be embedded as a link in the email. One of skill in the art will recognize that other vehicles for sending the cryptographic key to the taggee may be used without departing from the spirit and scope of the present invention. For example and without limitation, the cryptographic key may be sent to the taggee via SMS or MMS text message, instant message, smartphone application, etc.

Figure 4:
FIG. 4 is another exemplary email with a cryptographic key that may be sent to a taggee, according to an embodiment of the present invention.

FIGS. 3 and 4 illustrate exemplary emails that may be sent to the taggee. In FIG. 3, for example, the cryptographic key has been embedded as a link 302 in an email message 304. In this example, the taggee is Alice, and the taggee address is alice@abc.com. Also in this example, the tagger is Bob, and the tagger address is bob@xyz.com. Email 304 may include a preview 306 of the tagged electronic content.

The taggee may authorize association of the taggee's information with the electronic content by selecting link 302 ("Click here to authorize"). Alternatively, as shown in FIG. 4, the taggee may authorize the creation of a biometric profile using the electronic content by selecting link 402 ("Click here to join Profiles!"). Creation of a biometric profile allows web server 102 to locate additional electronic content associated with the taggee, even when the additional electronic content is not tagged (or otherwise indicated) as being associated with the taggee. Sharing of the taggee's biometric model, or locating additional electronic content associated with the taggee, may occur according to permissions granted by the taggee. For example, a taggee may select the individuals authorized to use the taggee's biometric model to label electronic content or those individuals whose content is used to update the taggee's biometric model. Further details on using a biometric profile to locate electronic content associated with an individual may be found in U.S. patent application Ser. No. 12/477,746, filed Jun. 3, 2009, issued as U.S. Pat. No. 8,380,004, titled "Object Image Matching and Applications Thereof," which is incorporated by reference herein in its entirety. In an embodiment, the example email of FIG. 3 is used when the taggee already has a corresponding biometric model stored in biometric model database 104, while the example email of FIG. 4 is used when no biometric profile corresponding to the taggee exists.

The taggee may receive the cryptographic key via taggee client 112 (FIG. 1). The taggee may then activate the cryptographic key, for example by selecting an embedded link or opening an attached file. In an embodiment, when the taggee activates the cryptographic key, the cryptographic key, along with the taggee's address, is sent to security module 106 via network 114 and web server 102. Decryption module 118 may use the taggee's address as the primary key to retrieve associated tag data from tag data database 108. If the tag data is indexed in database 108 by a hashed value of the taggee's address, decryption module 118 hashes the received taggee address according to a hashing algorithm to regenerate the primary key prior to retrieving the associated tag data. Alternatively, the taggee address may be hashed by taggee client 112, such that security module 106 receives the hashed taggee address from taggee client 112. Such an embodiment prevents the holder of the tag data (e.g., the database owner) from identifying the taggee, since the holder of the tag data cannot reverse engineer the taggee address from the hashed value. Once decryption module 118 retrieves the encrypted tag data from database 108 using the primary key, the cryptographic key received from taggee client 112 is used to decrypt the tag data. Web server 102 can then use the tag data to locate electronic content associated with the taggee. For example, the tag data may indicate that a tagged image of Alice is located on Bob's content-sharing page.

In an embodiment of the present invention, the cryptographic key used to encrypt the tag data is sent to the taggee without being stored in a central storage medium. This prevents anyone but the taggee from decrypting tag data corresponding to the taggee. Accordingly, in an embodiment, each time the taggee is identified by a tagger, a separate cryptographic key may be generated and sent to the taggee, and a separate entry stored in tag data database 108. While generating a new cryptographic key for every tag results in a highly secure system, the process becomes inefficient when a tagger is tagging a number of items as being associated with a taggee. The taggee may find it bothersome to receive multiple cryptographic keys, each of which has to be individually authorized and activated. Therefore, when a tagger tags a taggee in electronic content, an alternative embodiment allows a generated cryptographic key to be stored in temporary memory for a given session. If the tagger tags the taggee in additional electronic content within the session, the additional tag data is encrypted using the same cryptographic key. The duration of the session may be a fixed length of time, or may be dynamic depending on the activity level of the tagger (e.g., the session ends when the tagger ceases activity). Once the session has ended, the cryptographic key is sent to the taggee. In this manner, all of the tagged electronic content can be decrypted with minimal effort by the taggee while balancing the security demands of the content-sharing program.

Figure 5:
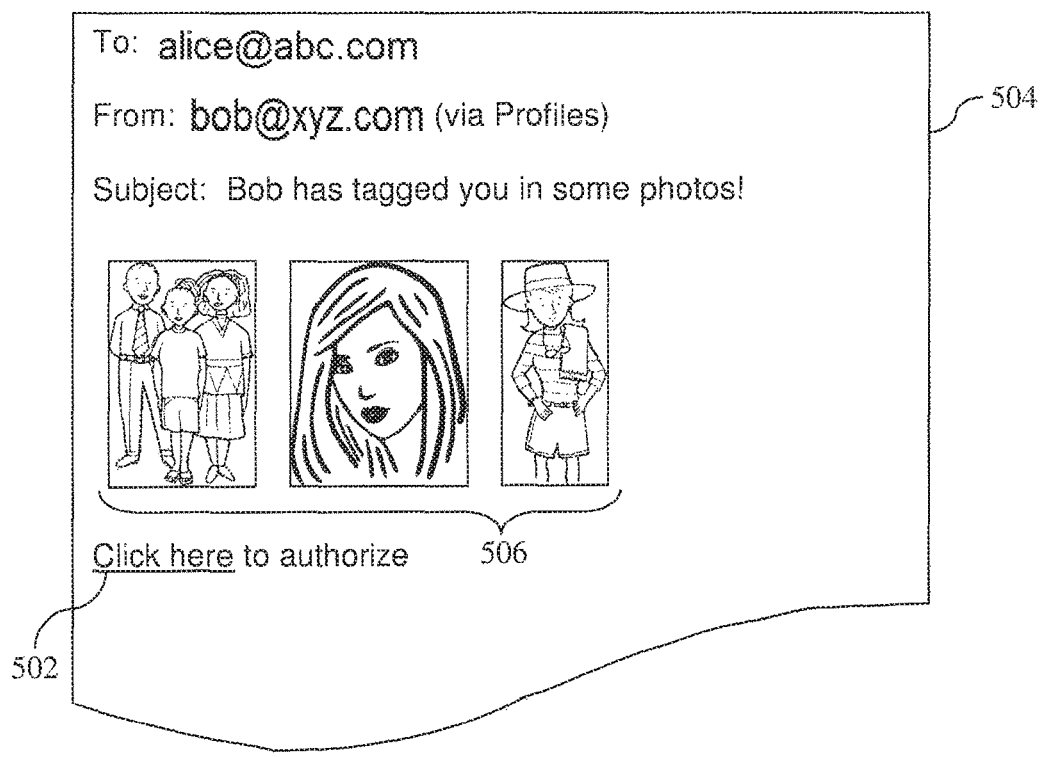
FIG. 5 is another exemplary email with a cryptographic key that may be sent to a taggee, according to an embodiment of the present invention.

FIG. 5 is an exemplary email that may be sent to the taggee when the cryptographic key is stored in temporary memory so as to allow encryption of a plurality of items. As with email message 304 in FIG. 3, email message 504 contains a link 502 allowing the taggee to authorize association of the taggee's information with electronic content. However, instead of preview 306 including a single piece of electronic content, email message 504 includes a preview 506 having multiple pieces of electronic content sharing the same cryptographic key.

In an embodiment, the activation of the cryptographic key by the taggee is treated as explicit authorization by the taggee to decrypt the tag data and associate the electronic content with the taggee. In another embodiment, the activation of the cryptographic key by the taggee causes the tag data to be decrypted, so that the taggee can preview the electronic content that is to be associated with the taggee. If the taggee chooses to authorize the association, the taggee may select a link or other indicator as evidence of the authorization. If the taggee declines the association, then the tag data is destroyed.

Once the electronic content is associated with the taggee, web server 102 may extract the taggee's biometric information from the electronic content. This biometric information may be stored in biometric model database 104 as associated with the taggee. Such biometric information may be used, for example, to generate a biometric model of the taggee so as to locate additional electronic content associated with the taggee, even when the additional electronic content is not tagged (or otherwise indicated) as being associated with the taggee. In an embodiment, the consent to associate electronic content with the taggee (which may be included in activation of the cryptographic key by the taggee) inherently includes consent to retrieve biometric information from the electronic content for the taggee's biometric model. In another embodiment, further explicit consent is required before biometric information can be retrieved for use in a biometric model.

2. Method

Figure 6:
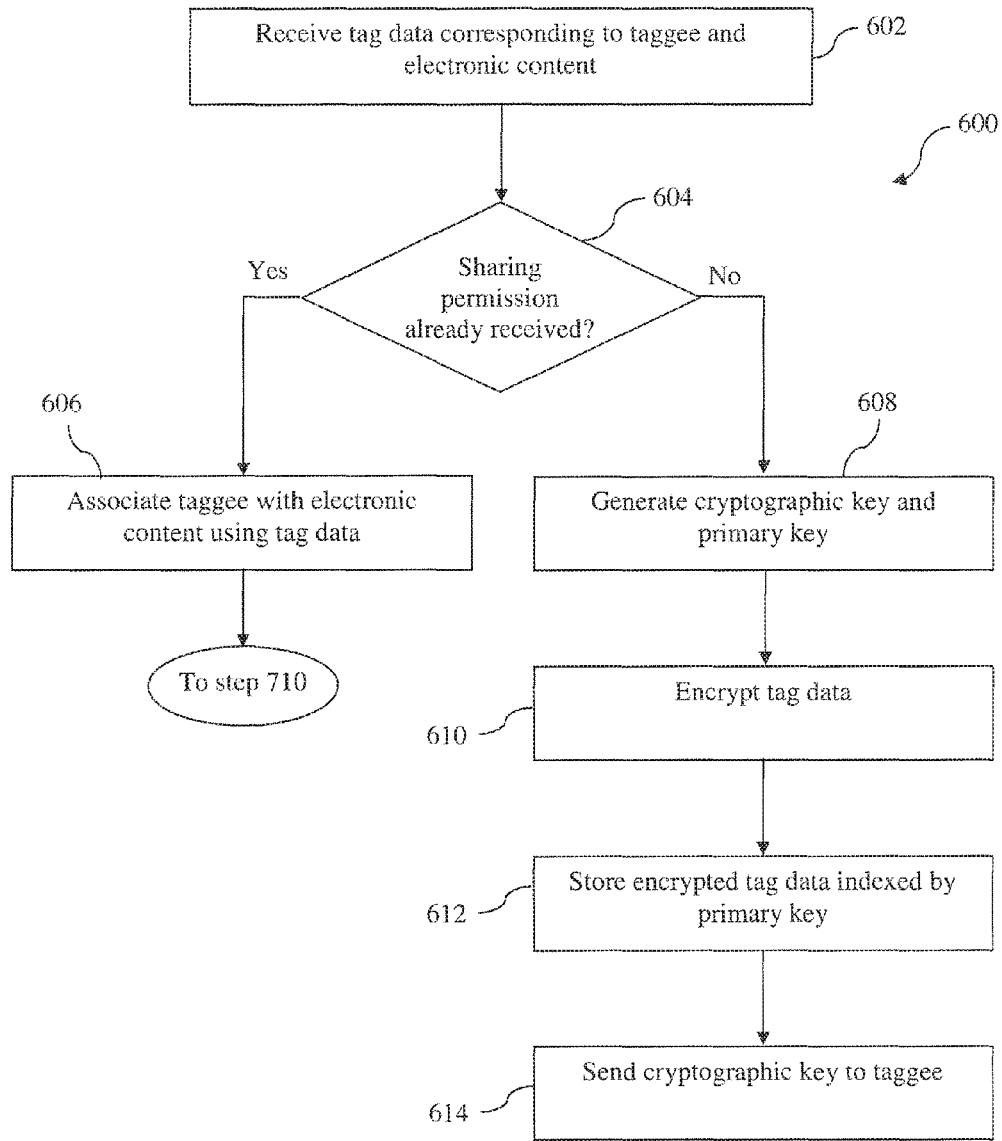
FIGS. 6 and 7 are flowcharts of an exemplary method for associating electronic content with a user, according to an embodiment of the present invention.

FIG. 6 is a flowchart illustrating an exemplary method 600 for utilizing a system for associating biometric data with an individual, such as system 100. In step 602, tag data corresponding to the taggee is received for particular electronic content. The taggee may be identified, for example, with a taggee address. The tag data may be received, for example, from taggee client 110. In step 604, it is determined whether the taggee has already given permission to associate electronic content with the taggee. If the taggee has already given permission, method 600 proceeds to step 606. In step 606, the taggee is associated with the electronic content using the received tag data. The method then proceeds to step 710, described below with respect to FIG. 7. If the taggee has not already given permission, method 600 proceeds to step 608.

In step 608, a cryptographic key and a primary key are generated. In an embodiment, the primary key is the taggee address. In another embodiment, the primary key is a hashed version of the taggee address. Such an embodiment prevents the holder of the tag data (e.g., the database owner) from associating the tag data with the taggee, since the holder of the tag data cannot reverse engineer the taggee address from the hashed value. In step 610, the tag data is encrypted using the generated cryptographic key. In step 612, the encrypted tag data is stored, indexed by the primary key. The encrypted tag data may be stored, for example, in tag data database 108. In step 614, the cryptographic key is sent to the taggee at the taggee address.

Figure 7:
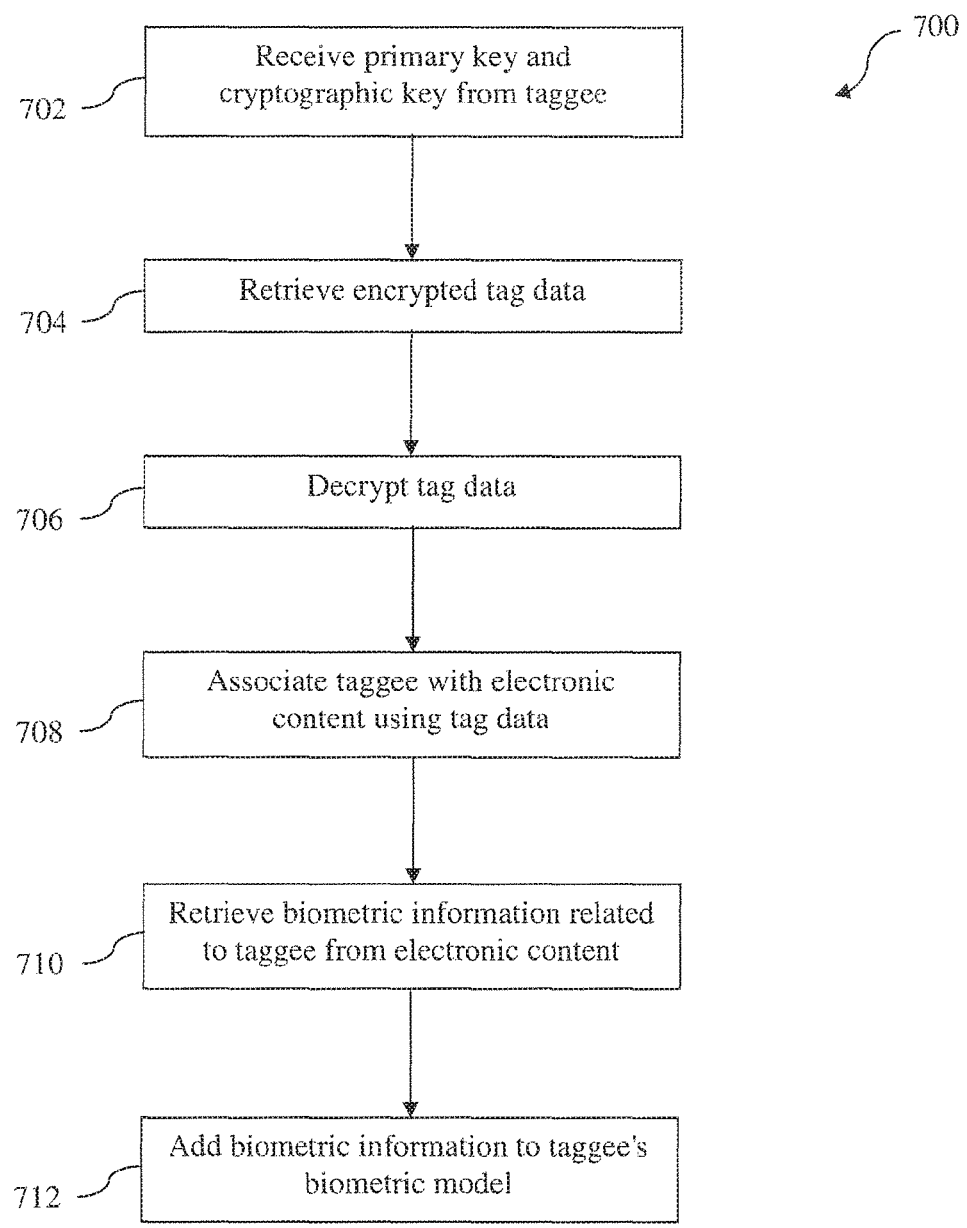

FIG. 7 is a flowchart illustrating an exemplary method 700 for further utilizing a system for associating biometric data with an individual, such as system 100. In step 702, a primary key and a cryptographic key are received from a taggee. In an embodiment, receipt of the primary key and cryptographic key indicates that the taggee has authorized association of the electronic content with the taggee. In another embodiment, receipt of the primary key and cryptographic key indicates that the taggee has requested a preview of the tagged electronic content. Receipt of the primary key may include the interim step of hashing the taggee address to regenerate the original primary key.

In step 704, the encrypted tag data is retrieved. The encrypted tag data may be retrieved using the primary key as an index. For example, as shown in FIG. 2, receipt of a primary key which is the hashed value of the taggee address can be used to locate and retrieve the ciphertext of the tag data.

Returning to FIG. 7, in step 706 the encrypted tag data is decrypted using the cryptographic key received from the taggee. If receipt of the primary key and cryptographic key indicated that the taggee has authorized association of the electronic content with the taggee, method 700 proceeds to step 708. If receipt of the primary key and cryptographic key indicated that the taggee has requested a preview of the tagged electronic content, an additional authorization or confirmation of the association may be received prior to proceeding to step 708.

In step 708, the tagged electronic content is associated with the taggee using the decrypted tag data. In step 710, biometric information related to the taggee is retrieved from the electronic content. In step 712, the biometric information retrieved from the electronic content is added to the taggee's biometric model. An exemplary method of biometric retrieval and model generation can be found in U.S. Patent Appl. Publication No. 2008/0130960, issued as U.S. Pat. No. 8,085,995, titled "Identifying Images using Face Recognition," which is incorporated by reference herein in its entirety. If a biometric model corresponding to the taggee did not exist prior to the association of the taggee with the electronic content, a new biometric model may be generated using the retrieved biometric information and associated with the taggee.

3. Example Computer Embodiment

Figure 8:
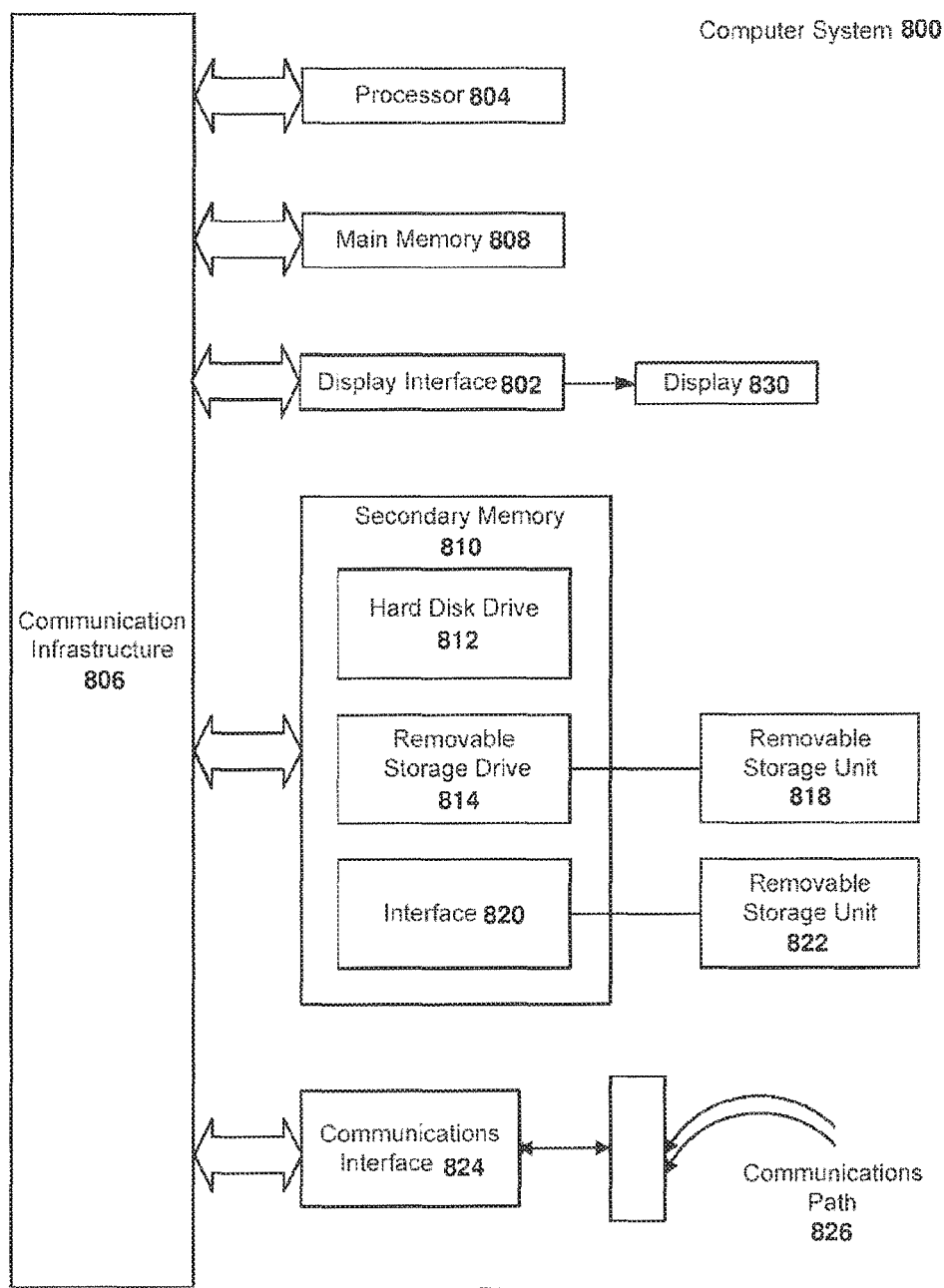
FIG. 8 is a diagram of an exemplary computer system that may be used in an embodiment of the present invention.

In an embodiment of the present invention, the system and components of embodiments described herein are implemented using well known computers, such as example computer system 800 shown in FIG. 8. For example, server 102 or clients 110, 112 can be implemented using computer system(s) 800.

Computer system 800 can be any commercially available and well known computer capable of performing the functions described herein.

Computer system 800 includes one or more processors (also called central processing units, or CPUs), such as a processor 804. Processor 804 is connected to a communication infrastructure 806.

Computer system 800 also includes a main or primary memory 808, such as random access memory (RAM). Main memory 808 has stored therein control logic (computer software), and data.

Computer system 800 also includes one or more secondary storage devices 810. Secondary storage device 810 includes, for example, a hard disk drive 812 and/or a removable storage device or drive 814, as well as other types of storage devices, such as memory cards and memory sticks. Removable storage drive 814 represents a floppy disk drive, a magnetic tape drive, a compact disk drive, an optical storage device, tape backup, etc.

Removable storage drive 814 interacts with a removable storage unit 818. Removable storage unit 818 includes a computer useable or readable storage medium having stored therein computer software (control logic) and/or data. Removable storage unit 818 represents a floppy disk, magnetic tape, compact disk, DVD, optical storage disk, or any other computer data storage device. Removable storage drive 814 reads from and/or writes to removable storage unit 818 in a well-known manner.

Computer system 800 also includes input/output/display devices 830, such as monitors, keyboards, pointing devices, etc., which communicate with communication infrastructure 806 through a display interface 802.

Computer system 800 further includes a communication or network interface 824. Communications interface 824 enables computer system 800 to communicate with remote devices. For example, communications interface 824 allows computer system 800 to communicate over communications path 826 (representing a form of a computer useable or readable medium), such as LANs, WANs, the Internet, etc. Communications interface 824 may interface with remote sites or networks via wired or wireless connections.

Control logic may be transmitted to and from computer system 800 via communication path 826. More particularly, computer system 800 may receive and transmit carrier waves (electromagnetic signals) modulated with control logic via communication path 826.

Any apparatus or article of manufacture comprising a computer useable or readable medium having control logic (software) stored therein is referred to herein as a computer program product or program storage device. This includes, but is not limited to, computer system 800, main memory 808, secondary storage device 810, and removable storage unit 818. Such computer program products, having control logic stored therein that, when executed by one or more data processing devices, causes such data processing devices to operate as described herein, represent embodiments of the invention.

Embodiments of the invention can work with software, hardware, and/or operating system implementations other than those described herein. Any software, hardware, and operating system implementations suitable for performing the functions described herein can be used. Embodiments of the invention are applicable to both a client and to a server or a combination of both.

The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A computer-implemented method, comprising:
   receiving a request including tag data that associates a taggee with electronic content;
   encrypting the tag data with a cryptographic key;
   transmitting the cryptographic key to the taggee having a taggee address;
   generating a primary key based on the taggee address;
   storing and indexing the encrypted tag data using the primary key; and
   providing the stored and indexed encrypted tag data based on the primary key, wherein the primary key is regenerated from the taggee address when the primary key is not received from the taggee, and the electronic content is configured to be associated with the taggee based on the tag data that has been decrypted according to a received key.

2. The computer-implemented method of claim 1, further comprising:
   receiving the cryptographic key and at least one of the primary key and the taggee address from the taggee; and
   retrieving the stored encrypted tag data provided from a storage medium using the primary key.

3. The computer-implemented method of claim 2, further comprising:
   searching for the taggee in a plurality of images from a tagger; and
   associating the taggee with images that include the taggee.

4. The computer-implemented method of claim 2, further comprising:
   extracting biometric data of the taggee from the electronic content; and
   adding the biometric data of the taggee from the electronic content to a biometric model of the taggee.

5. The computer-implemented method of claim 1, wherein the generating the primary key comprises hashing the taggee address.

6. The computer-implemented method of claim 1, wherein the cryptographic key is not stored in a central storage medium.

7. The computer-implemented method of claim 1, wherein the cryptographic key is stored in temporary memory, and the encrypted data includes tag data from a plurality of images.

8. The computer-implemented method of claim 1, wherein the transmitting includes transmitting via at least one of email, SMS message, MMS message, instant message, and smartphone application.

9. A processor-based system, comprising:
at least one server coupled to a memory, the at least one server configured to store and provide access to electronic content, the at least one server including a security device;
the security device configured to prevent unauthorized association of electronic content with a taggee, the security device comprising:
an encryption device configured to encrypt, using a cryptographic key, received tag data that associates the taggee with the electronic content, send the cryptographic key to the taggee, and generate a primary key based on a taggee address; and
a decryption device configured to receive the cryptographic key from the taggee and decrypt the tag data using the cryptographic key, wherein the decryption device is configured to regenerate the primary key upon receipt of the taggee address from the taggee; and
a tag data storage medium configured to store the tag data based on the primary key.

10. The processor-based system of claim 9, further comprising a biometric model storage medium configured to store biometric information from the electronic content associated with the taggee.

11. The processor-based system of claim 9, wherein the encryption device is further configured to generate a primary key based on a hashed value of the taggee address.

12. The processor-based system of claim 9, wherein the encryption device is further configured to send the cryptographic key to the taggee without storing the cryptographic key in memory.

13. The processor-based system of claim 9, wherein the encryption device is further configured to store the cryptographic key in temporary memory when there is a plurality of electronic content requested to be associated with the taggee.

14. A non-transitory computer readable medium including instructions executable by
at least one processor coupled to a storage medium, the at least one processor configured to:
receive a request including tag data that associates a taggee with electronic content;
encrypt the tag data that associates the taggee with a cryptographic key;
transmit the cryptographic key to the taggee at a taggee address;
generate a primary key based on the taggee address;
store and index the encrypted tag data using the primary key; and
providing the encrypted tag data based on the primary key, wherein the primary key is regenerated from the taggee address when the primary key is not received from the taggee.

15. The non-transitory computer readable medium including of claim 14, the at least one processor is further configured to:
receive the cryptographic key and at least one of the primary key or the taggee address from the taggee;
retrieve the encrypted tag data provided from the storage medium using the primary key; and
associate the electronic content with the taggee based on the tag data that has been decrypted according to the received cryptographic key.

16. The non-transitory computer readable medium including of claim 14, further comprising a temporary storage medium configured to temporarily store the cryptographic key when a plurality of electronic content is requested to be associated with the taggee.

17. The computer-implemented method of claim 1, further comprising:
requesting authorization from the taggee to decrypt the tag data using the cryptographic key.

18. The computer-implemented method of claim 1, further comprising:
decrypting the encrypted tag data based on a receipt of the cryptographic key, wherein one or more users other than the taggee are able to view the decrypted tag data that associates the taggee with the electronic content.

* * * * *